(12) United States Patent
Barton et al.

(10) Patent No.: US 8,137,814 B2
(45) Date of Patent: Mar. 20, 2012

(54) SOLAR CONTROL GLAZING

(75) Inventors: Neil Barton, St Helens (GB); Ashley Carl Torr, Ormskirk (GB)

(73) Assignees: Pilkington Group Limited, St. Helens, Merseyslde (GB); Pilkington Automotive Limited, St. Helens, Merseyside (GB)

( * ) Notice: Subject to any disclaimer, the term of this patent is extended or adjusted under 35 U.S.C. 154(b) by 89 days.

(21) Appl. No.: 11/664,695

(22) PCT Filed: Oct. 10, 2005

(86) PCT No.: PCT/GB2005/003895
§ 371 (c)(1),
(2), (4) Date: May 24, 2007

(87) PCT Pub. No.: WO2006/043026
PCT Pub. Date: Apr. 27, 2006

(65) Prior Publication Data
US 2008/0070045 A1    Mar. 20, 2008

(30) Foreign Application Priority Data
Oct. 18, 2004 (GB) .................................. 0423085.0

(51) Int. Cl.
*B32B 17/06* (2006.01)
(52) U.S. Cl. .......... 428/433; 428/34; 428/689; 428/701; 428/702; 428/913
(58) Field of Classification Search .................. None
See application file for complete search history.

(56) References Cited

U.S. PATENT DOCUMENTS

| | | | |
|---|---|---|---|
| 3,514,175 A * | 5/1970 | Jenkins | 359/359 |
| 5,229,881 A | 7/1993 | Day et al. | |
| 6,048,621 A | 4/2000 | Gallego et al. | |
| 6,218,018 B1 | 4/2001 | McKown et al. | |
| 6,280,847 B1 | 8/2001 | Corkhill et al. | |
| 2001/0031365 A1 | 10/2001 | Anderson et al. | |
| 2002/0172775 A1* | 11/2002 | Buhay et al. | 427/376.2 |

(Continued)

FOREIGN PATENT DOCUMENTS

EP    0 691 199 A    1/1996

(Continued)

OTHER PUBLICATIONS

International Search Report.

(Continued)

*Primary Examiner* — Ling Xu
(74) *Attorney, Agent, or Firm* — Buchanan Ingersoll & Rooney PC

(57) ABSTRACT

A vehicle glazing comprises a pane of glazing material, an absorptive coating, which absorbs radiation of wavelength greater than 400 nm (and possibly up to 100 μm), on a first surface of the pane, and a low emissivity coating on the first surface, or a second surface, of the pane. The glazing may be used as a roof glazing. The absorptive coating may comprise either a) a metal, metal alloy or material based on a metal alloy, or b) at least one layer of a dielectric material and at least one layer of a metal or metal alloy. The low emissivity coating may comprise either a) a transparent conductive oxide (and optionally a dopant material), or b) at least one metal layer and at least one dielectric layer.

25 Claims, 2 Drawing Sheets

U.S. PATENT DOCUMENTS

Figure 1:
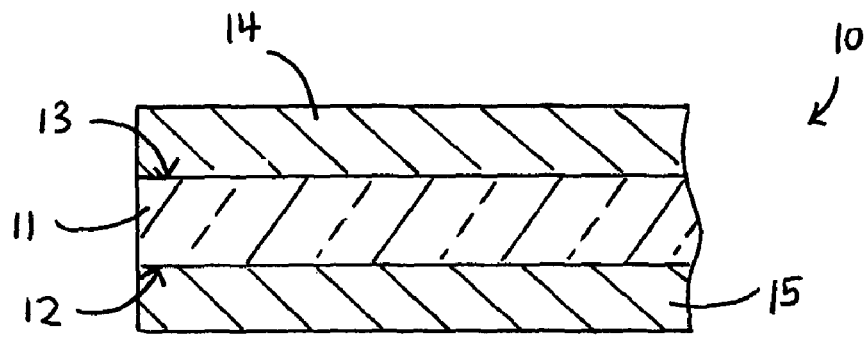

| | | |
|---|---|---|
| 2003/0215648 A1 | 11/2003 | Varanasi et al. |
| 2004/0106017 A1 | 6/2004 | Buhay et al. |
| 2004/0124665 A1 | 7/2004 | Kraenzler et al. |
| 2005/0196623 A1* | 9/2005 | McKown, Jr. ............... 428/432 |
| 2006/0090834 A1* | 5/2006 | Huang et al. ............... 156/99 |

FOREIGN PATENT DOCUMENTS

| | | | |
|---|---|---|---|
| EP | 1 201 616 A2 | | 5/2002 |
| GB | 1 524 393 A | | 9/1978 |
| GB | 2 289 273 A | | 11/1995 |
| WO | WO 98/34883 A1 | | 8/1998 |
| WO | WO-00/37376 | * | 6/2000 |
| WO | WO 01/02167 A1 | | 1/2001 |
| WO | WO 03/024649 A1 | | 3/2003 |

OTHER PUBLICATIONS

UK Search Report under Section 17(5) GB0423085.0, Mar. 2005.
UK Search Report under Section 17(6) GB0423085.0, Apr. 2005.

* cited by examiner

SOLAR CONTROL GLAZING

The present invention relates to a vehicle glazing, especially to a coated solar control vehicle glazing, which may be incorporated into a laminated vehicle glazing.

A pane of tinted glass which has a coating on one of its surfaces to impart solar control properties to the glass is known. One such pane of glass is described in GB 2,289,273 A as a dark grey glass which is especially appropriate for installation as a vehicle sunroof. The glass contains 0.5 to 0.9% total iron ($Fe_2O_3$), 120 to 250 ppm Co, 25 to 100 ppm Se and 50 to 200 ppm $Cr_2O_3$. In one embodiment the glass supports a coating of at least one metal oxide (for example titanium oxide, tin oxide, iron oxide, cobalt oxide, chromium oxide, or a mixture of these) such that when in 4 mm thickness, the glass has a light transmission factor (Illuminant C) of less than 15% and an energy transmission factor of less than 25%.

WO 01/02167 A1 provides an example of a tinted laminated glazing which includes a coating to achieve certain solar control properties. This glazing is described as being particularly useful as a vehicle roof glazing. WO '167 describes two plies of glass which are joined together by a ply of interlayer material, the composition of the glass being such that the luminous transmission (Illuminant A) of the glazing is less than 35% and the energy transmission is less than 15%. The glazing may include functional layers inside the laminate construction. These layers serve to reduce the energy transmitted by the glazing into a vehicle which may be glazed with the laminated glazing by reflecting the energy away from the interior of the vehicle, or absorbing the energy.

The problem with each of the vehicle glazings described above is that, although solar energy may be absorbed by the glazing, when that energy is re-radiated, some is invariably directed into the vehicle which is glazed with one of the glazings. The temperature inside that vehicle rises as a result of the transmitted thermal energy, making the environment inside the vehicle uncomfortable for the vehicle occupants.

It would therefore be desirable to provide a vehicle glazing (in both monolithic and laminated form) that reduces the amount of energy, especially heat energy, in the form of incident solar radiation which would otherwise be transmitted through the glazing and into a vehicle which is fitted with the glazing.

We have found that such vehicle glazings may be achieved by providing, in a first aspect, a pane of glazing material which includes an absorptive coating and a low emissivity coating, and in a second aspect, a laminated construction including an absorptive coating and a low emissivity coating.

According to the first aspect of the present invention there is provided a vehicle glazing comprising a pane of glazing material, an absorptive coating, which absorbs radiation of wavelength greater than 400 nm, on a first surface of the pane, and a low emissivity coating on the first surface, or on a second surface, of the pane. By "a first surface" and "a second surface" is meant the two major opposing surfaces of a pane of glazing material.

The low emissivity coating is advantageously on the interior surface of the pane of glazing material. By "the interior surface" is meant the surface of that pane of glazing material which would contact the interior environment of a vehicle into which the glazing may be fitted.

Absorption of solar energy that is incident on the glazing, especially heat energy in the form of near infrared ("NIR") radiation (relatively short wavelength, high energy infrared radiation), may be achieved by the presence of an absorptive coating. However, absorbed solar energy is re-radiated by the absorptive medium (in this case the absorptive coating) over a different wavelength range than that of the incident energy and in all directions. At least some re-radiated energy may be directed towards the low emissivity coating. The re-radiated energy includes an infrared component of longer wavelength and lower energy (far infrared ("FIR") radiation) than the absorbed (incident) NIR radiation. Because a low emissivity coating is a poor radiator of FIR radiation, the total amount of thermal energy passing into a vehicle glazed with a solar control glazing of the present invention is thereby reduced.

Furthermore, the absorptive coating may reduce the intensity of visible light that is transmitted to the inside of a vehicle into which the glazing may be fitted, providing the glazing with a privacy function as well as a solar control function.

Achievement of superior vehicle passenger comfort, for example by minimising the heat gain in the interior of a vehicle, and reduced demand on the resources of a vehicle, for example by reducing the need to use air-conditioning systems and the like, is a high priority for vehicle manufacturers. Absorption of higher energy NIR radiation followed by at least partial reduction of re-radiated lower energy FIR radiation by a glazing can help to achieve these goals.

Preferably, the low emissivity coating is on the second surface of the pane of glazing material, in which case it is on an opposite surface of the pane of glazing material to the absorptive coating. Alternatively the low emissivity coating may be on the first surface of the pane of glazing material, along with the absorptive coating. Typically, the absorptive coating will lie between the pane of glazing material and the low emissivity coating.

A vehicle glazing according to the invention may used to glaze any opening in a vehicle (although when the visible light transmission (Illuminant A) of the glazing drops below 70%, because of legal requirements in USA and Europe especially, the glazing could only be used to glaze an opening behind the B-pillar of a vehicle in those places). A vehicle glazing according to the invention is especially useful as a roof glazing. A roof glazing includes conventional sunroofs and what are known in the art as full-area rooflights (or moonroofs or panoramic roofs).

The absorptive coating generally absorbs radiation of wavelength up to 100 µm. By this is meant that it preferably absorbs radiation at least in the visible and infrared (including both NIR and FIR) regions of the electromagnetic spectrum. Absorption in the visible and infrared regions is substantially constant over the appropriate range of wavelengths (approximately 0.4 to 100 µm).

Typically, an absorptive coating may comprise a metal, metal alloy or a material based on a metal alloy, as all of these materials provide the requisite absorption properties for the present invention.

Metals which may be used to form an absorbing coating of the invention include titanium, zirconium, copper, platinum, gold, zinc, tin, nickel and chromium. Suitable metal alloys include NiCr, TiN and stainless steels. Stainless steel oxides and oxynitrides are also suitable materials. When any of these materials are used, the absorptive coating may consist of a single layer of that material, however, the single layer may itself comprise many atomic or molecular layers of the material being used.

Alternatively, an absorbing coating stack may be used as the coating. At its simplest, the coating stack may comprise at least one layer of a dielectric material and at least one layer of a metal or metal alloy. A coating stack more typically comprises at least first and second layers of a dielectric material in between which a layer of a metal or metal alloy is located.

The metals and metal alloys suitable for use in a single layer absorptive coating, as listed above, may be used in the coating stack. Materials which may be used as a dielectric layer include tin oxide, titanium oxide, silicon dioxide, zinc oxide, indium-tin oxide ("ITO"), silicon nitride, titanium nitride, titanium oxynitride (TiN$_x$O$_y$), NiCrO, carbides and stainless steel oxides and oxynitrides.

An absorptive coating may be provided as a "hard" coating, which may be deposited in an "on-line" process: a coating is pyrolytically deposited onto the surface of float glass during its formation, in known manner, for example by use of a chemical vapour deposition process. Generally, deposition occurs in the region of a float line where the glass ribbon is at a temperature of between 400 and 760° C.; glass of this temperature may be found towards the exit of the tin bath, in the lehr gap (i.e. in the gap between the tin bath and the annealing lehr) and in the hot-end of the annealing lehr. As the glass is fully annealed (i.e. sequentially cooled from its higher temperature state to room temperature), the coating is cured, thus the coating species which initially fused to the glass surface via pyrolysis effectively forms part of the final glass product. The coated side of the glass may be further subjected to a polishing process to reduce the microscopic rugosity of the coated surface to produce a glass that may be more easily handled.

Alternatively, an absorptive coating may be provided as an "off-line coating": a coating is deposited onto the surface of a piece of glass subsequent to complete manufacture of the glass, i.e. in a separate process from the float process. Off-line coatings include sputtered coatings which are deposited, for example by use of a magnetic sputtering technique under vacuum conditions. Off-line coatings are commonly softer than typical pyrolytic coatings.

A number of low emissivity coatings are known in the art, any of which may be used in accordance with the present invention. The emissivity of a particular coating refers to the tendency of that coating to radiate energy. Thus a low emissivity coating is a poor thermal radiator (compared to a blackbody entity, which is a perfect radiator and is defined as having an emissivity of unity).

The low emissivity coating present on a surface of the pane of glazing material will normally be such that, when used on 3 mm clear float glass, the coated glass has an emissivity in the range from 0.01 to 0.45; the actual value being measured according to EN 12898 (a published standard of the European Association of Flat Glass Manufacturers). Coatings (when used in 3 mm clear float glass) providing an emissivity less than 0.3 are preferred.

A low emissivity coating may be provided as an on-line coating or an off-line coating in the same manner as described earlier for absorptive coatings. Hard coatings generally have emissivities greater than 0.15 (and preferably less than 0.2), whilst off-line coatings, normally sputtered coatings, generally have emissivities greater than 0.02 (and preferably less than 0.1). In both cases, the emissivities may be compared with the assumed normal emissivity of clear uncoated glass, which has a value of around 0.89.

A hard (or pyrolytic) low emissivity coating may comprise a single layer of metal oxide, which is preferably a transparent conductive oxide. Oxides of metals such as tin, zinc, indium, tungsten and molybdenum may be comprised in the single layer of metal oxide. Usually the coating further comprises a dopant, for example fluorine, chlorine, antimony, tin, aluminium, tantalum, niobium, indium or gallium, so that coatings such as fluorine-doped tin oxide and tin-doped indium oxide may result. As with a single layer of absorptive coating, the low emissivity layer itself may comprise many atomic or molecular layers of the material being used.

Off-line low emissivity coatings typically comprise a multi-layer coating stack which normally includes at least one metal layer (or a conductive metal compound) and at least one dielectric layer. The multi-layer stack structure may be repeated to further enhance the emissivity of the coating. Amongst other similar metals, silver, gold, copper, nickel and chromium may be used as the metal layer in a multi-layer stack; indium oxide, antimony oxide or the like may be used as the conductive metal compound. Coatings comprising one or two layers of silver interleaved between layers of a dielectric such as an oxide of silicon, aluminium, titanium, vanadium, tin or zinc are typical multilayer stacks. Generally the one or more layers from which the coating is formed are of the order of tens of nanometres in thickness.

A low emissivity coating provided on the interior surface of a pane of glazing material may reduce the level of thermal radiation from the sun that passes through the glazing (especially re-radiated FIR radiation that results from absorption of NIR radiation that is incident on the glazing). This effect is likely to have most utility during summer months when the amount of solar radiation that is incident on a vehicle glazing will usually be at its greatest.

Surprisingly, the use of a low emissivity coating is not found to lead to an unacceptable build up of heat trapped in a vehicle; indeed with modern vehicles equipped with air conditioning, this is unlikely to be a problem and, with or without air conditioning, is much less significant than the discomfort which results from high levels of thermal radiation transmitted through, or re-radiated by, the glazing onto the vehicle occupants.

However, during winter months, when it may be necessary to provide heat to the interior of a vehicle, for example to de-mist the windows of the vehicle, the low emissivity coating (which is typically on the surface of the glazing facing into the vehicle) may inhibit the escape of heat radiation from inside the vehicle to the surrounding external environment. Minimising the amount of heat loss from a vehicle may serve to reduce the "cold-shoulder/head effect". This effect essentially characterises the localised coolness in temperature that may be felt by a vehicle occupant when positioned close to a glazing, for example a side glazing or a rooflight. The cold-shoulder/head effect is a result of a vehicle's tendency to lose heat to the outside world, particularly via it's glazings and especially on a cold day. A low emissivity coating may reduce this heat loss by reflecting FIR radiation back into the vehicle, where it may heat the localised cool air close to the glazings.

At least one coating underlayer may be present under the absorptive coating and/or low emissivity coating. Such an underlayer may act as a barrier coating (to control migration of alkali metal ions from the glass into the other coatings) and/or as a colour suppressing layer (to suppress iridescent reflection colours resulting from variations in thickness of the absorptive coating and/or the low emissivity coating).

Usually the pane of glazing material will be in a thickness of 8 mm or less (yet greater than 1.5 mm), however a thickness in the range from 2 mm to 6 mm is preferred.

The pane of glazing material may be a pane of clear glass or a pane of body-tinted glass, and it may be toughened, for example by thermal or chemical tempering. When a pane of glass is subjected to a heat treatment process, for example tempering or bending, this may be before or after deposition of one or more of the coatings. Should the heat treatment process occur after deposition of at least one coating, that deposited coating should be one which is not degraded by the exposure to elevated temperature. The pane of glazing material may additionally be flat or it may be curved. Alternatively the pane of glazing material may be a pane of a plastics material (a "plastic glazing").

A pane of clear glass, and the base glass of a pane of body-tinted glass, may typically have a composition in the range (by weight):

| | |
|---|---|
| $SiO_2$ | 68-75% |
| $Al_2O_3$ | 0-5% |
| $Na_2O$ | 10-18% |
| $K_2O$ | 0-5% |
| MgO | 0-10% |
| CaO | 5-15% |
| $SO_3$ | 0-2% |

The composition may also contain other additives, for example, refining aids, which would normally be present in an amount of up to 2%.

A pane of body-tinted glass may further comprise 0.5 to 4.0% (by weight of the glass) of total iron (calculated as $Fe_2O_3$). Such a glass normally has a ferrous oxide content (calculated as FeO) in the range 0.05 to 1.6% by weight. Absorption of total energy that is incident on the glazing (especially in the infrared) by the absorptive coating may be augmented by regulating the ferrous oxide content of the pane of glass. Preferably the ferrous oxide content is greater than 0.4% by weight, further preferably greater than 0.8% by weight and most preferably greater than 1.2% by weight. The higher the ferrous oxide content of the glass, the more total energy is absorbed by the glass, particularly NIR radiation.

Preferably a pane of body-tinted glass includes 5 to 350 ppm by weight of cobalt oxide (calculated as $Co_3O_4$). In addition to the colourant properties of cobalt, it may serve to further reduce (in addition to the absorptive coating) the visible light transmission of the glazing. Thus cobalt oxide is preferably included in the glass in the range from 40 to 320 ppm, further preferably from 100 to 270 ppm and most preferably from 150 to 230 ppm by weight.

A body-tinted glass preferably also contains selenium (calculated as Se) in the range up to 70 ppm, although preferably less than 55 ppm, further preferably less than 35 ppm and most preferably less than 20 ppm. Selenium aids achievement of a bronze to grey tone when in co-existence with cobalt.

Advantageously, a pane of body-tinted glass may have a nickel content (calculated as NiO) in the range up to 500 ppm, and preferably it is greater than 55 ppm, further preferably greater than 100 ppm and most preferably greater than 200 ppm. Nickel is an ingredient that is added to a glass composition to achieve a grey to brown colour tone.

A vehicle glazing according to the present invention preferably has a visible light transmission of less than 50%. The visible light transmission of a glazing is measured using C.I.E. Illuminant A ("$LT_A$") over the wavelength range 380 nm to 780 nm at 5 nm intervals. An $LT_A$ of 40% or less, still less than 30%, and further 20% or less, is preferred. An $LT_A$ of 15% or less is especially preferred. At a particular thickness, and for a particular composition of glazing material in combination with one or more specific coatings (if any), the visible light transmission of a glazing is typically substantially constant. However, when a glazing is installed in a vehicle (thus "in use" as a vehicle glazing), it may be subjected to a source of energy which causes the visible light transmission of the glazing to change (typically to drop) from an initial value to a working value. In such circumstances, if the initial value of the visible light transmission is not less than 50% (which it may be), the working value is preferably less than 50%.

The glazing preferably has a transmitted energy of 30% or less when measured using Parry Moon at Air Mass 2. Further preferably the glazing has a transmitted energy of less than 20% and most preferably less than 10%. Transmitted energy ("TE"), also known as direct solar heat transmission ("DSHT") is measured at Air Mass 2 (simulating rays from the sun incident at an angle of 30° to the horizontal) over the wavelength range 350 to 2100 nm at 50 nm intervals. A low emissivity coating appears to be successful in suppressing re-radiated energy, especially FIR radiation, in addition to incident FIR radiation, thereby reducing the amount of heat transmitted through a glazing according to the invention.

According to the second aspect of the invention, there is provided a laminated glazing, for use in a vehicle, comprising two plies of glazing material with a sheet of interlayer laminated therebetween, an absorptive coating, which absorbs radiation of wavelength greater than 400 nm, on a surface of one of the plies of glazing material, and a low emissivity coating on the interior surface of the glazing.

By "the interior surface" of the laminated glazing is meant the exposed surface of said glazing which faces into a vehicle into which the glazing may be fitted (i.e. the external surface of the inner ply). If conventional surface-numbering terminology is used, wherein the surface of the laminate which contacts the environment external to a vehicle is known as surface 1 and the surface which contacts the internal environment is known as surface 4, then the coating is supported on surface 4 (the performance of a low emissivity coating is currently far superior on surface 4 than it is on either surface 2 or surface 3).

Preferably the absorptive coating and the low emissivity coating are each on a separate ply of glazing material. Alternatively the absorptive coating and the low emissivity coating may be on the same ply of glazing material, in which case the monolithic glazing described earlier may form one ply of the laminate construction.

A laminated vehicle glazing according to the invention may used to glaze any opening in a vehicle (although when the visible light transmission (Illuminant A) of the glazing drops below 70%, because of legal requirements in USA and Europe especially, the glazing could only be used to glaze an opening behind the B-pillar of a vehicle in those places). A laminated vehicle glazing according to the invention is especially useful as a roof glazing.

The absorptive coating generally absorbs radiation of wavelength up to 100 µm. By this is meant that it preferably absorbs radiation at least in the visible and infrared (including both NIR and FIR) regions of the electromagnetic spectrum. Absorption in the visible and infrared regions is substantially constant over the appropriate range of wavelengths (approximately 0.4 to 100 µm).

The low emissivity coating present on the interior surface of the glazing will normally be such that, when used on 3 mm clear float glass, the coated glass has an emissivity in the range from 0.01 to 0.45. Coatings (when used in 3 mm clear float glass) providing an emissivity less than 0.3 are preferred.

At least one coating underlayer may be present under the absorptive coating and/or low emissivity coating, as described earlier for the monolithic glazing.

At least one ply of glazing material used to construct the laminated glazing of the invention may be a pane of clear glass or a pane of body-tinted glass, as described earlier for the monolithic aspect of the invention. Alternatively, at least one ply may be a pane of a plastics material (a "plastic glazing").

A laminated glazing is optimally provided in a thickness of 10 mm or less (yet greater than 3 mm), however a thickness in the range from 4 mm to 7 mm is preferred. Furthermore, each ply comprised in the laminate is advantageously of thickness in the range from 1.5 mm to 5 mm, although 2 mm to 3.5 mm is preferred.

The sheet of interlayer material is often a sheet of transparent plastic, for example polyvinylbutyral or such other suitable laminating material, and is ordinarily provided in a thickness of 0.76 mm. The sheet of interlayer material may however be tinted to have an optimum visible light transmission of 35% or less, preferably 18% or less. Furthermore, the sheet of interlayer material may absorb infrared radiation, for example when it comprises ITO. By describing a sheet of interlayer material as "infrared absorbing" it is meant that when such a sheet (in 0.76 mm thickness) is interleaved between two pieces of clear glass (each of 2.1 mm thickness), the resulting laminate has a selectivity greater than 0.5 and preferably greater than 1, where the "selectivity" is calculated by dividing the percentage visible light transmission by the percentage total energy, i.e. $LT_A/TE$, each measured for the laminate. Absorption of total energy that is incident on the glazing (especially thermal energy) by the absorptive coating included in the laminate may be augmented by the presence of a body-tinted interlayer.

The laminated glazing preferably has a visible light transmission of less than 50%, further preferably of less than 40% and most preferably of less then 30%. An $LT_A$ of 20%, or still less than 15%, is especially preferred. At a particular thickness, and for a particular composition of glazing material in combination with one or more specific coatings (if any), the visible light transmission of a laminated vehicle glazing is typically substantially constant. However, when a laminated glazing is installed in a vehicle (thus "in use" as a vehicle glazing), it may be subjected to a source of energy which causes the visible light transmission of the glazing to change (typically to drop) from an initial value to a working value. In such circumstances, if the initial value of the visible light transmission is not less than 50% (which it may be), the working value is preferably less than 50%.

Advantageously, the laminated glazing has a transmitted energy of 30% or less. Of further advantage is transmitted energy of 20% or less, and further still of 10% or less.

Figure 2:
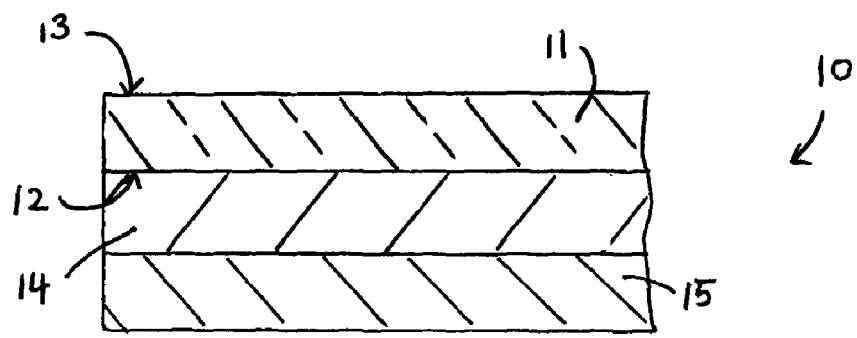
Figure 3:
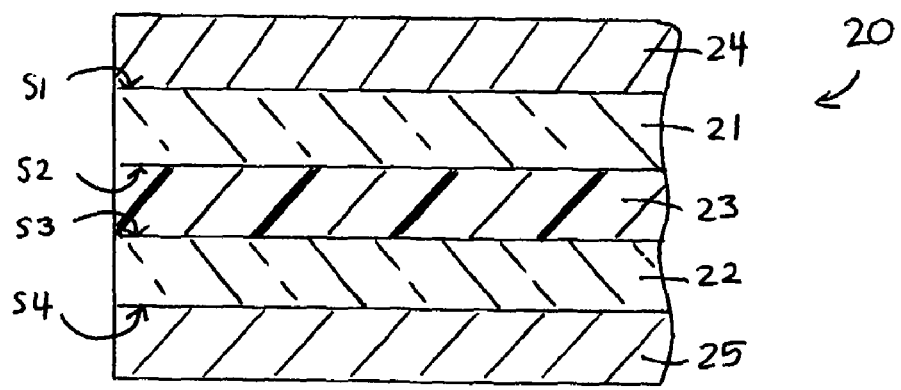
Figure 4:
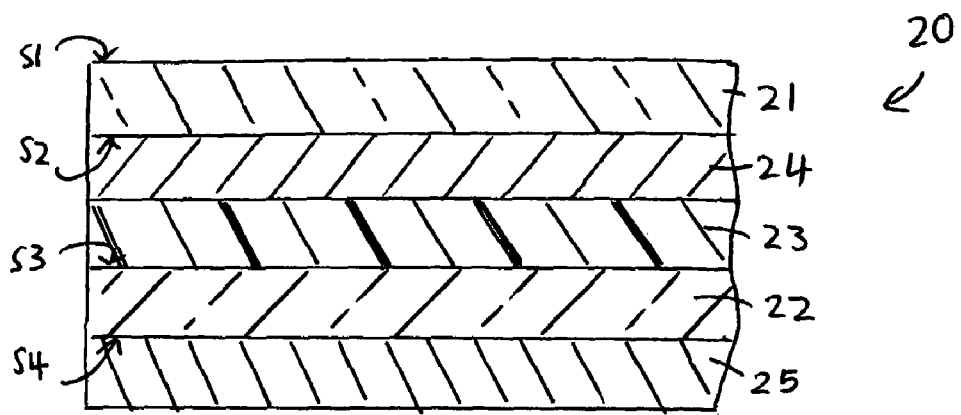
Figure 5:
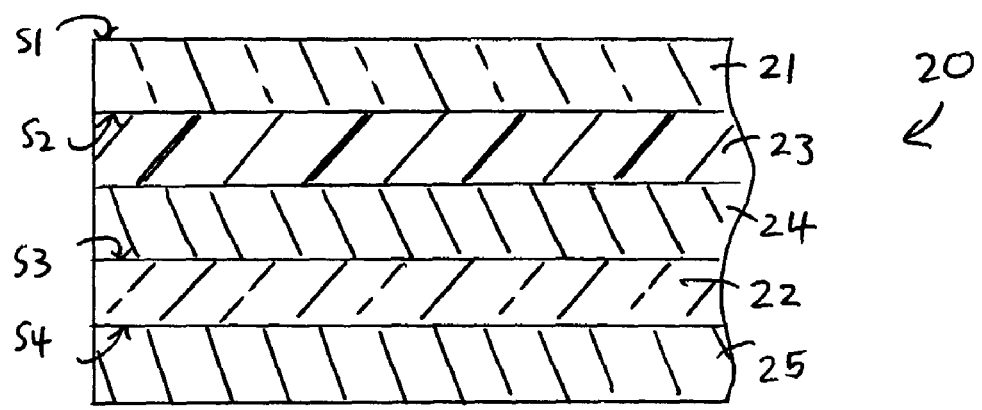
Figure 6:
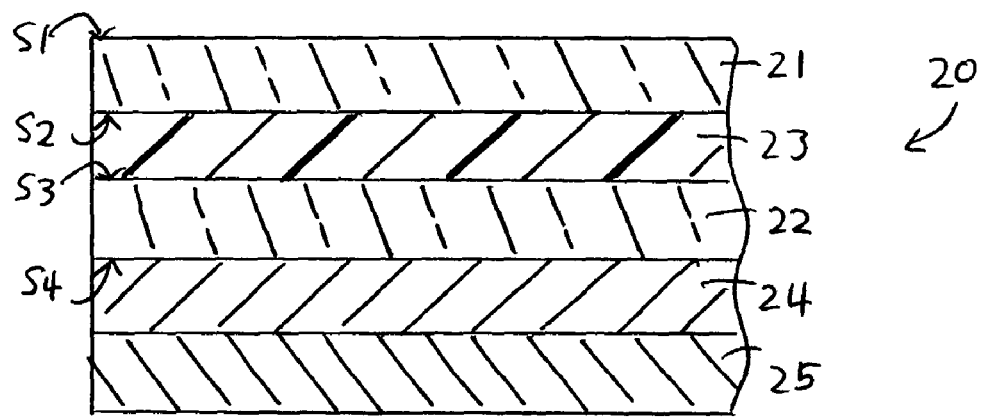

For a better understanding, the present invention will now be more particularly described, by way of non-limiting example, with reference to and as shown in the accompanying drawings (not to scale) wherein:

FIG. 1 is a cross sectional view through a first embodiment of a monolithic vehicle glazing according to the first aspect of the invention, FIG. 2 is a cross sectional view through a second embodiment of a monolithic vehicle glazing according to the first aspect of the invention, FIG. 3 is a cross sectional view through a first embodiment of a laminated vehicle glazing according to the second aspect of the invention, FIG. 4 is a cross sectional view through a second embodiment of a laminated vehicle glazing according to the second aspect of the invention, FIG. 5 is a cross sectional view through a third embodiment of a laminated vehicle glazing according to the second aspect of the invention, and FIG. 6 is a cross sectional view through a fourth embodiment of a laminated vehicle glazing according to the second aspect of the invention.

FIGS. 1 and 2 illustrate vehicle glazing 10 comprising pane of glazing material 11 which has inner surface 12 and outer surface 13 (labelled with respect to a vehicle into which glazing 10 may be fitted). Vehicle glazing 10 further comprises absorptive coating 14 and low emissivity coating 15.

In FIG. 1, inner surface 12 of pane of glazing material 11 is provided with low emissivity coating 15, whilst outer surface 13 is provided with absorptive coating 14. In FIG. 2, inner surface 12 of pane of glazing material 11 is provided with absorptive coating 14 and low emissivity coating 15, such that absorptive coating 14 is located between pane of glazing material 11 and low emissivity coating 15.

Both absorptive coating 14 and low emissivity coating 15 may be provided directly onto pane of glazing material 11, or there may be one or more further coating layers (not shown) located between pane of glazing material 11 and absorptive coating 14 or low emissivity coating 15. These further coating layers may include barrier layers and/or colour-suppression layers, both of which are generally known in the art.

In FIGS. 1 and 2, pane of glazing material 11 may be a pane of clear glass, for example with a composition (by weight) of: 72.1% $SiO_2$, 1.1% $Al_2O_3$, 13.5% $Na_2O$, 0.6% $K_2O$, 8.5% CaO, 3.9% MgO, 0.2% $SO_3$ and optionally up to 0.2% $Fe_2O_3$ (preferably less than 0.15%). Pane of glazing material could alternatively be a pane of plastics material, for example in the form of polycarbonate or polymethylmethacrylate, or a pane of body-tinted glass having either Composition A or Composition B (described below).

Composition A produces a grey glass having a base glass composition including (by weight) 72.1% $SiO_2$, 1.1% $Al_2O_3$, 13.5% $Na_2O$, 0.6% $K_2O$, 8.5% CaO, 3.9% MgO and 0.2% $SO_3$, and a colourant portion comprising (by weight) 1.45% total iron (calculated as $Fe_2O_3$), 0.30% ferrous oxide (calculated as FeO), 230 ppm $Co_3O_4$, 210 ppm NiO and 19 ppm Se. Such a glass is currently available as GALAXSEE™ from Pilkington plc in the United Kingdom.

Composition B produces a green glass which has the same base glass composition as composition A above, and a colourant portion comprising (by weight) 1.57% total iron (calculated as $Fe_2O_3$), 0.31% ferrous oxide (calculated as FeO), 115 ppm $Co_3O_4$, 0 ppm NiO and 5 ppm Se. Such a glass is currently available as SUNDYM 435™, again from Pilkington plc in the United Kingdom.

FIGS. 3, 4, 5 and 6 illustrate laminated vehicle glazing 20 which comprises outer ply of glazing material 21, inner ply of glazing material 22 and interlayer ply 23, in the form of a sheet of clear PVB, which nominally has a thickness of 0.76 mm. Laminated vehicle glazing 20 further comprises absorptive coating 24 and low emissivity coating 25. The surfaces of the plies of glazing material have been numbered S1, S2, S3 and S4 according to conventional numbering terminology (as explained earlier).

FIG. 3 shows that absorptive coating 24 is provided surface S1 on outer ply of glazing material 21, whilst in FIG. 4 it is provided on surface S2. FIG. 5 shows that absorptive coating 24 is provided on surface S3 on inner ply of glazing material 22, whilst in FIG. 6 it is provided on S4. In each of FIGS. 3 to 6, low emissivity coating 25 is provided on surface S4 (in FIG. 6, low emissivity coating 25 is actually provided on absorptive coating 24, which is on surface S4).

Both absorptive coating 24 and low emissivity coating 25 may be provided directly on a ply of glazing material, or there may be one or more further coating layers (not shown) located between the ply of glazing material and absorptive coating 24 or low emissivity coating 25. These further coating layers may include barrier layers and/or colour-suppression layers, both of which are generally known in the art.

In each of FIGS. 3 to 6, each of plies of glazing material 21,22 may be a pane of clear glass, for example with a composition as described earlier, or a pane of a plastics material, for example in the form of polycarbonate or polymethylmethacrylate, or a pane of body-tinted glass having either Composition A or Composition B described earlier.

The following table illustrates non-limiting examples of laminated glazing 20. In each example, low emissivity coating 25 has an emissivity of 0.13, interlayer 23 is 0.76 mm clear PVB, and each ply of glass 21,22 is 2.1 mm thick. For each example the following information is provided in the table: the composition (clear, A or B as described earlier) of each ply of glass 21,22, the nature of the absorptive coating 24 and the visible light transmission, the total energy transmission and the CIELAB colour co-ordinates (a* and b*—measured using Illuminant D65, 10° observer) of the laminate.

TABLE 1

| Example | Outer glass ply 21 | Inner glass ply 22 | Absorptive Coating 24 | $LT_A$ (%) | TE (%) | a* | b* |
|---|---|---|---|---|---|---|---|
| 1 | B | B | — | 29.1 | 18.5 | −6.4 | 0.4 |
| 2 | B | A | — | 17.8 | 12.7 | −1.0 | 1.4 |
| 3 | A | A | — | 11.2 | 9.1 | 3.9 | 2.5 |
| 4 | Clear | A | Ti | 13.9 | 11.1 | 1.3 | 0.8 |
| 5 | Clear | A | NiCrN & TiN | 15.0 | 11.9 | 1.6 | 1.3 |

Examples 1 to 3 are comparative examples illustrating prior art versions of laminated glazing 20 which do not include absorptive coating 24, but which are instead comprised of two plies of body-tinted glass. Examples 4 and 5 are examples of the invention; they show that a ply of clear glass can be combined with a ply of body-tinted glass, along with an absorptive coating, in a laminate construction to provide a laminated vehicle glazing that has at least equivalent performance to prior art laminated glazings.

The invention claimed is:

1. A vehicle glazing configured to be mounted on a vehicle having a vehicle interior, the vehicle glazing comprising only a single pane of glazing material possessing an inner surface adapted to face the vehicle interior and an outer surface adapted to face away from the vehicle interior, an absorptive coating, which absorbs radiation of wavelength greater than 400 nm, on the outer surface of the pane, and a low emissivity coating on the inner surface of the pane, and the vehicle glazing has a visible light transmission of 15% or less and a transmitted energy of 20% or less.

2. A vehicle glazing as claimed in claim 1, wherein the glazing is a vehicle roof glazing.

3. A vehicle glazing as claimed in claim 1 wherein the absorptive coating absorbs radiation of wavelength up to 100 μm.

4. A vehicle glazing as claimed in claim 1 wherein the absorptive coating comprises a metal, a metal alloy or a material based on a metal alloy.

5. A vehicle glazing as claimed claim 1 wherein the absorptive coating comprises at least one layer of a dielectric material and at least one layer of a metal or metal alloy.

6. A vehicle glazing as claimed in claim 1 wherein the low emissivity coating has an emissivity in the range from 0.01 to 0.45.

7. A vehicle glazing as claimed in claim 6 wherein the low emissivity coating includes a transparent conductive oxide.

8. A vehicle glazing as claimed in claim 7 wherein the low emissivity coating further includes a dopant material.

9. A vehicle glazing as claimed in claim 6 wherein the low emissivity coating includes at least one metal layer and at least one dielectric layer.

10. A vehicle glazing as claimed in claim 1 wherein the pane of glazing material is a pane of clear glass or a pane of body-tinted glass.

11. A vehicle glazing as claimed in claim 1 wherein the pane of glazing material is a pane of a plastics material.

12. A vehicle glazing as claimed in claim 1 having a transmitted energy of 10% or less.

13. A vehicle glazing as claimed in claim 1, wherein the absorptive coating contacts the outer surface of the pane and the low emissivity coating contacts the inner surface of the pane.

14. A vehicle glazing as claimed in claim 1, wherein the pane of glazing material has a soda-lime-silica glass composition.

15. A laminated glazing, for use in a vehicle having a vehicle interior, the glazing possessing an interior surface adapted to face the vehicle interior, the glazing comprising two plies of glazing material with a sheet of interlayer formed of transparent plastic laminated therebetween, an absorptive coating, which absorbs radiation of wavelength greater than 400 nm, on a surface of one of the plies of glazing material, and only a single low emissivity coating, the single low emissivity coating on the interior surface of the glazing, and the laminated glazing has a visible light transmission of 15% or less and a transmitted energy of 20% or less.

16. A laminated glazing as claimed in claim 15 wherein the absorptive coating and the low emissivity coating are each on a separate ply of glazing material.

17. A laminated glazing as claimed in claim 15 wherein the absorptive coating and the low emissivity coating are on the same ply of glazing material.

18. A laminated glazing as claimed in claim 15 wherein the laminated glazing is a roof glazing.

19. A laminated glazing as claimed in claim 15 wherein the absorptive coating absorbs radiation of wavelength up to 100 μm.

20. A laminated glazing as claimed in claim 15 wherein the low emissivity coating has an emissivity in the range from 0.01 to 0.45.

21. A laminated glazing as claimed in claim 15 wherein at least one ply of glazing material is a pane of clear glass or a body-tinted glass.

22. A laminated glazing as claimed in claim 15 wherein at least one ply of glazing material is a pane of a plastics material.

23. A laminated vehicle glazing as claimed in claim 15 having a transmitted energy of 10% or less.

24. A vehicle roof glazing configured to be mounted on a vehicle having a vehicle interior, the vehicle roof glazing comprising no more than one pane of glazing material, the one pane of glazing material possessing an inner surface adapted to face the vehicle interior and an outer surface adapted to face away from the vehicle interior, an absorptive coating, which absorbs radiation of wavelength greater than 400 nm, on the outer surface of the one pane, and only a single low emissivity coating, the single low emissivity coating being on the inner surface of the glazing, the vehicle roof glazing having a visible light transmission of 15% or less and a transmitted energy of 20% or less.

25. A vehicle roof glazing as claimed in claim 24 having a transmitted energy of 10% or less.

* * * * *